(No Model.) 3 Sheets—Sheet 1.
A. E. STOVE.
COUPLING FOR FIRE HOSE, &c.
No. 595,219. Patented Dec. 7, 1897.
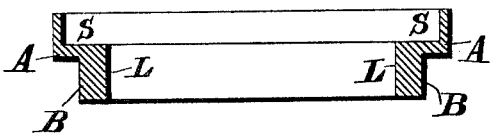
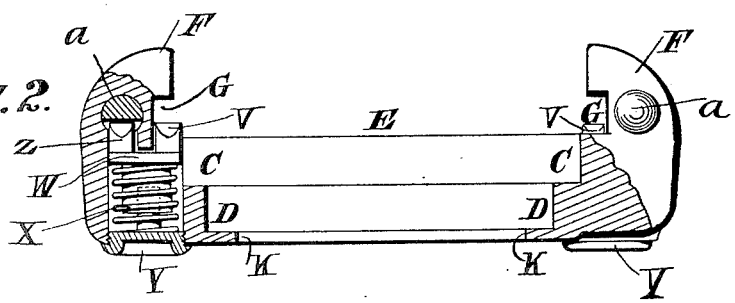
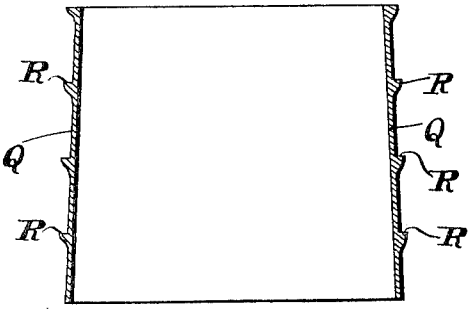
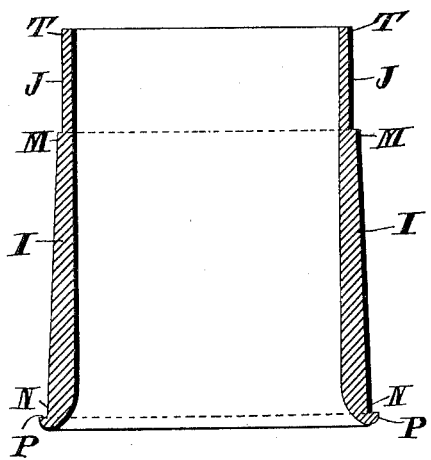
Witnesses Inventor
Alfred E. Stove
by James L. Norris
Attorney (No Model.) 3 Sheets—Sheet 2.
A. E. STOVE.
COUPLING FOR FIRE HOSE, &c.
No. 595,219. Patented Dec. 7, 1897.
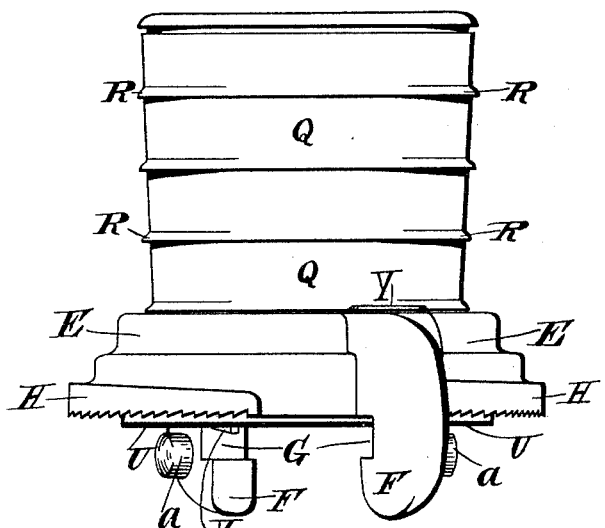
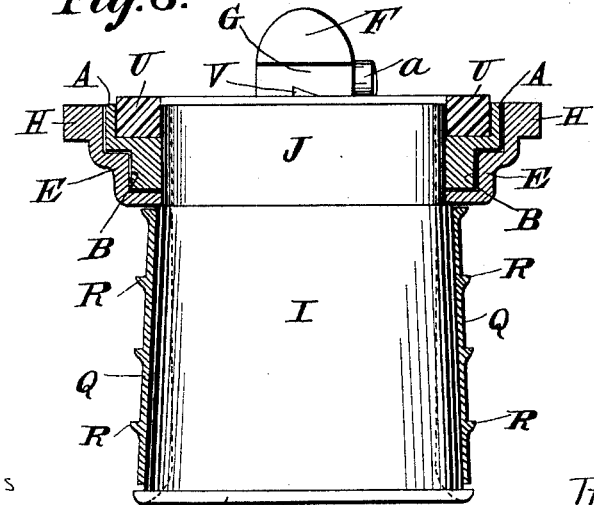
Witnesses
Inventor
Alfred E. Stove
by James L. Norris.
Attorney (No Model.)  3 Sheets—Sheet 3.
A. E. STOVE.
COUPLING FOR FIRE HOSE, &c.
No. 595,219.  Patented Dec. 7, 1897.
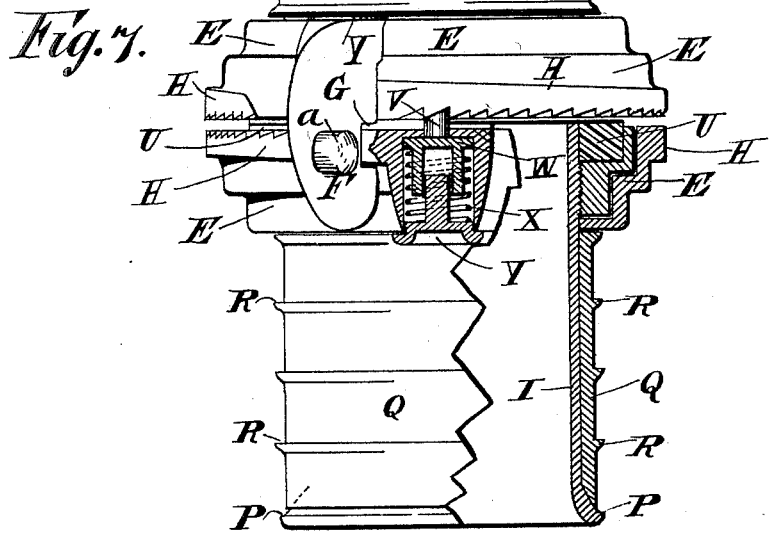
Witnesses
Inventor
Alfred E. Stove
by James L. Norris
Attorney

UNITED STATES PATENT OFFICE.

ALFRED EDWIN STOVE, OF LONDON, ENGLAND.

COUPLING FOR FIRE-HOSE, &c.

SPECIFICATION forming part of Letters Patent No. 595,219, dated December 7, 1897.

Application filed April 2, 1897. Serial No. 630,443. (No model.) Patented in England March 7, 1896, No. 5,198.

*To all whom it may concern:*

Be it known that I, ALFRED EDWIN STOVE, a subject of the Queen of Great Britain, residing at 101 Leadenhall Street, London, England, have invented certain new and useful Improvements in or Relating to Fire-Hose and Like Couplings, (patented in Great Britain March 7, 1896, No. 5,198,) of which the following is a specification.

This invention relates to hose-couplings.

The details of the invention are particularly applicable to those couplings in which each half-coupling has a ring with grip-lugs and has a partial rotation for moving against inclined ribs when the two halves are being coupled up and while being uncoupled.

The invention can be adapted for ordinary leather or canvas hose used by fire brigades, by brewers, for connection with ships' pumps, for garden, and other purposes in which hoses are generally employed. Its chief purpose, however, is for fire brigades, on account of the many and extraordinary changes, risks, and exposures it has to undergo.

My invention will be clearly understood by reference to the annexed drawings, in which the several letters of reference agree in all the figures, and wherein—

Figure 1 is a section of band. Fig. 2 is a section of ring. Fig. 3 is a section of sleeve. Fig. 4 is a section of neck, these figures showing the several parts of one half-coupling detached. Fig. 5 is an exterior elevation of one half-coupling. Fig. 6 is a sectional elevation of the adjoining half. Fig. 7 is an elevation of the two half-couplings coupled together, the lower half-coupling being partly in section. Fig. 8 is a right-angled elevation of the catch appliance to that shown at Fig. 2.

Hitherto each half-coupling has been in a single casting—that is, the band and the neck—and to enable the ring to be fitted and held in position a separate band had to be soldered, brazed, or screwed on, an operation which raised the cost of manufacture beyond the commercial value of the article when completed. The object, therefore, is to reduce the cost of production by making each piece separately and then combining them by any desired means, a construction by practice being found to have the advantage of considerably increasing their strength and offering facilities for easy repairs should such be necessary.

A indicates the band with reduced diameter at B for fitting into the recesses C D of the ring E, this latter being provided with two lugs F F, with undercuts G G for engaging over the inclined segmental ribs H H of the opposite half-coupling when coupling up, each half-coupling being alike and interchangeable.

The neck I has a deep shoulder J, which fits exactly the smaller diameter K of the ring and also the smaller diameter L of the band A. The neck I is slightly coned from M to N and terminates in a lip P, on which the sleeve Q rests, said sleeve being also coned to fit the exterior of the neck I, on which it can turn to a twist pull of the flexible hose-piping when attached to the sleeve, the projections R R serving for the wrapping of the binding-wire to fix the hose to it.

The larger recess S in the band, in conjunction with the extension T of the neck-shoulder J, forms an annular chamber into which an india-rubber packing-ring U can be placed, the rubber projecting beyond the edge for compression when the two half-couplings are being coupled up, said compression making the meeting faces absolutely water-tight against internal pressure.

I serrate the face edges of the inclined ribs H H for the reception and locking action of a catch V, this being within but capable of projecting from one of the lugs F of each half-coupling, said catch V being on a plate W and governed by a spring X, located on the lug F by a cap Y. The plate W has also a stud Z, extending into the lug F, and is operative in one direction by a transverse bolt $a$, which when pushed in by hand forces down the stud Z and with it the catch V to release said catch from the serration of the rib H, which then enables the rings E E to be turned in opposite directions by an attendant for separating the half-couplings. The catch V is slightly shorter than the stud Z, so that when the bolt $a$ is pushed in the catch V is released without the stud Z being actually out of the inclined recess with which the bolt $a$ is provided.

The push-in action on the bolt $a$ for the release of the catch V is effected by an attendant when in the act of uncoupling, the bolt $a$ being in such position that the first portion of the pressure to separate the lugs F F is upon the bolt, a continuation of such pressure effecting the turning of the lugs.

The bolt may be in the form of a lever capable of being retained in a locked or unlocked condition by a spring when moved into the desired position.

In Figs. 4 and 6 the neck I is shown as tapering on its outer surface between the shoulder M and the base, so that the sleeve Q, which is tapered inside, fits in contact water-tight with the neck I.

In the construction shown in Fig. 7 the exterior of the neck I and the interior of the sleeve Q are parallel for the greater part of their length, the contact and surface fitting portion being at the bottom. The hose encircles the sleeve Q and is bound tightly thereon, so that should any kink occur in the hose when it is reeled out it will be removed by the action of the water untwisting the hose and compel the sleeve to revolve on the neck I.

By making the neck and sleeve conical, as shown in Figs. 4 and 6, or conical for a portion of the length, as shown in Fig. 7, a perfect surface contact is secured and leakage prevented, and as the parts become worn the surface contact becomes better and closer, thus always insuring a water-tight connection, a result not possible to be attained when the neck and sleeve have parallel sides throughout their length.

What I claim, and desire to secure by Letters Patent, is—

1. In a half-coupling, the combination of a neck I having a shoulder M, a coupling-ring E fitted over said neck and supported on said shoulder, said ring having interior annular recesses C, D, and provided with means for locking to a similar half-coupling, an annular band A seated in said recesses and provided with an interior annular recess S, and a yielding packing-ring U seated in the recess S, substantially as described.

2. The combination with the half-coupling provided with toothed and wedge-shaped circumferential flanges and with undercut lugs F for engaging the flanges of a corresponding half-coupling, two catches V, Z, arranged to reciprocate in said lugs, bolts $a$ arranged to slide transversely in said lugs and provided with beveled recesses, said bolts at one end projecting beyond the faces of the lugs for engagement by a spanner, and a spring operating to project the catches V, Z, respectively into engagement with the toothed flanges and recessed bolts, substantially as described and for the purpose specified.

In testimony whereof I have hereunto set my hand in presence of two subscribing witnesses.

ALFRED EDWIN STOVE.

Witnesses:
EDMUND STANHOPE SNEWIN,
WILLIAM OSWALD BROWN.